United States Patent
Gore et al.

(10) Patent No.: US 6,176,199 B1
(45) Date of Patent: *Jan. 23, 2001

(54) METHOD FOR LOCALIZING ALLANTOIC FLUID OF AVIAN EGGS

(75) Inventors: Ann K. Gore, Clayton; Thomas Bryan, Raleigh, both of NC (US)

(73) Assignee: Embrex, Inc., Durham, NC (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 09/175,696

(22) Filed: Oct. 20, 1998

(51) Int. Cl.[7] .................................................. A01K 45/00
(52) U.S. Cl. .............................................................. 119/6.8
(58) Field of Search ............................. 119/6.8, 6.6, 6.5

(56) References Cited

U.S. PATENT DOCUMENTS

| | | | |
|---|---|---|---|
| 2,477,752 | 8/1949 | Kiss | 119/6.8 |
| 4,040,388 | 8/1977 | Miller | 119/6.8 |
| 4,398,499 | 8/1983 | Blakely | 119/325 |
| 4,469,047 | 9/1984 | Miller | 119/6.8 |
| 4,593,646 | 6/1986 | Miller et al. | 119/6.8 |
| 4,681,063 | 7/1987 | Hebrank | 119/6.8 |
| 4,903,635 | 2/1990 | Hebrank | 119/6.8 |
| 5,056,464 | 10/1991 | Lewis | 119/6.8 |
| 5,136,979 | 8/1992 | Paul et al. | 119/6.8 |
| 5,179,913 | 1/1993 | Cannon | 119/300 |
| 5,444,045 | 8/1995 | Francis et al. | 514/12 |
| 5,699,751 | * 12/1997 | Phelps et al. | 119/6.8 |

OTHER PUBLICATIONS

Romanoff, Alexis, The Avian Embryo: Structural and Functional Development, The Macmillan Company, New York, pp. 1111–1140.

Abstract of Derwent WPI, Accession No. 92–388543.

* cited by examiner

Primary Examiner—Peter M. Poon
Assistant Examiner—Judith A. Nelson
(74) Attorney, Agent, or Firm—Myers Bigel Sibley & Sajovec, P.A.

(57) ABSTRACT

Methods of pooling or localizing the allantoic fluid present in avian shell eggs, so that the fluid may be sampled, assessed or injected, are described. The methods involve tilting the avian shell egg so that the major axis of the egg is from about 10 to 180 degrees from the vertically upright position, so that the allantois pools under the uppermost portion of the egg shell. The allantoic fluid may then be sampled, or a substance injected into the allantois, by a vertical needle or probe traveling in a downward direction.

28 Claims, 7 Drawing Sheets

METHOD FOR LOCALIZING ALLANTOIC FLUID OF AVIAN EGGS

FIELD OF THE INVENTION

The present invention relates to methods of pooling or localizing the allantoic fluid present in avian shell eggs, so that the fluid may be readily sampled, assessed, or injected with a substance. Thus the present invention also relates to a method of directing a probe into the allantois of an egg for the purpose of sampling or examining the allantoic fluid contained therein, or to a method of injecting a substance into the allantois of a shell egg.

BACKGROUND OF THE INVENTION

The allantois or allantoic sac is a portion of an avian egg that develops and then enlarges in the egg from about the $5^{th}$ to $13^{th}$ day, and thereafter is absorbed and diminishes in size until the egg is hatched. The allantoic sac functions as a respiratory surface, a calcium adsorbing tissue, a liquid waste receptacle for urine secreted by the mesonephros, and as a water reservoir to sustain later stage development of the embryo. The allantoic sac reaches its peak volume at about the $11^{th}$ day of incubation and begins to diminish in size after about the $13^{th}$ day. Because the allantoic sac essentially grows to surround the embryo, it normally exists as a relatively thin layer under the inner shell membrane which presents a difficult target for injection even during the period of maximum volume.

Methods for producing influenza and other viral vaccines involve the growth of the viruses in embryonated chicken eggs. Typically, each egg must be inoculated by injection of a small volume of virus into the allantoic cavity. The injected eggs are then incubated and opened to allow harvesting of the allantoic fluid and the virus growing therein. See, e.g., U.S. Pat. No. 4,338,296 to Lobmann.

Additionally, various materials may be injected into the avian embryo in ovo, or into the various compartments within the embryonated avian egg, to achieve beneficial effects in a subsequently hatched chick. Such beneficial effects include increased growth, prevention of disease, increasing the percentage hatch of multiple incubated eggs, and otherwise improving physical characteristics of hatched poultry. Additionally, certain types of vaccinations are suitable for in ovo administration (see U.S. Pat. No. 4,458,630 to Sharma).

One method of sampling or injecting the allantoic fluid of an avian egg involves candling of individual eggs to locate the allantois, and then injecting or sampling the allantois by hand using a syringe. Injection into the allantois by hand has been practiced in the biological sciences for the purpose of culturing various microorganisms therein. However, because of the difficulty of reliable targeting the allantois using high volume or automated methods, the poultry industry has not generally used the allantois as a target for injection.

A number of automatic egg injection devices have been developed. These include U.S. Pat. Nos. 5,056,464 to Lewis; U.S. Pat. Nos. 4,903,635 and 4,681,063 to Hebrank; U.S. Pat. No. 5,136,979 to Paul et al.; and U.S. Pat. Nos. 4,040,388, 4,469,047 and 4,593,646 to Miller, which are incorporated herein by reference in their entirety.

Recently, efforts by the poultry industry to inject into the allantois using vertical downward injection through the large end of a vertically oriented egg by traversing the air sac and air sac membrane have been reported, but efforts to accomplish this on a large scale using conventional egg injection equipment have produced mixed results with a significant number of injections discharging into the air sac or the amnion instead of the allantois. It is therefore an object of the present invention to provide a method whereby the allantoic sac may be reliably targeted for injection with, for example, microorganisms that are to be cultivated in the egg or materials that are beneficial to the embryo. It is a further object of the present invention to provide a method whereby the allantoic sac may be reliably targeted for piercing with a probe such as a hypodermic needle for purposes of analyzing or sampling the allantoic fluid contained therein. It is a further object of the present invention to provide an improved method for reliably injecting into the allantois of an egg on a large scale using conventional egg injection equipment, and to provide a method that injects or reaches the allantois without piercing the air cell membrane. It is a further object of this invention to provide a method for utilizing an improved egg tray in the process of injecting into the allantois of an egg on a large scale using conventional egg equipment. These and other objects of the invention will be apparent to those skilled in the art in view of the ensuing description and claims.

SUMMARY OF THE INVENTION

In accordance with the method of the present invention, an avian shell is rotated or tilted so that the major axis of the egg is from about 10 to 180 degrees from the vertically upright position, where the upright large end of the egg containing the air sac defines the zero degree position. Such orientation of the egg away from the vertically upright position causes the allantois to pool within the egg on the uppermost side of the egg. This enlarged area of the allantoic sac is thereupon targeted for injection or sampling; the injector or sampling device need not traverse the air cell to reach the allantois.

The angle of injection into the egg may be vertically downward, horizontal or at any convenient angle. When the long axis of the egg is greater than about 10 degrees or about 20 degrees from vertical, the allantoic sac is conveniently targeted by downward vertical injection using conventional egg injection equipment; the angle of egg orientation can be chosen so that the injector or sampling device does not traverse the air cell of the egg. Injection of the egg in this manner is facilitated by the methods of the present invention utilizing egg trays designed to orient a plurality of avian eggs at a predetermined angle, used in combination with conventional egg-injection equipment using a vertical downwardly traveling injection needle.

Where the allantois of an egg is targeted for injection, the injection needle is directed into the egg at a predetermined angle and depth to target the area of the allantoic sac having the greatest volume and hence the largest target area. The relationship between egg orientation, allantoic sac configuration and location and direction of injection to optimize the probability of injection into the allantois will be apparent from the following drawings and detailed description of the invention.

A first aspect of the present invention is a method for injecting a substance into the allantois of an avian egg during the last quarter of incubation. The long axis of the egg is oriented to a predetermined angle from about 10 degrees to 180 degrees from vertical (where the large end of the egg in an upwardly vertical position defines zero degrees vertical). This orientation of the egg causes the allantois of the egg to pool and enlarge the allantoic sac in an area of the egg under the upper portion of the egg shell. A needle is inserted downwardly through the shell of the egg and directly into the enlarged allantoic sac, and the substance is injected into the allantois.

A further aspect of the present invention is a method for injecting a substance into the allantois of a plurality of chicken eggs in the 16$^{th}$ to 19$^{th}$ day of incubation. The eggs are oriented on an egg tray to a predetermined angle from about 10 degrees to 180 degrees from vertical (where zero degrees vertical is defined by the large end of the egg in a vertically upward position). This orientation of the egg causes the allantois of each egg to pool and enlarge the allantoic sac in a predetermined area of the egg under the upper portion of the egg shell. An injection needle is inserted downwardly into each egg through the shell and into the enlarged allantoic sac, and the substance is injected through the needle into the allantois of each egg.

A further aspect of the present invention is a method for directing a probe into the allantois of an avian egg in the last quarter of incubation. The long axis of the egg is oriented to a predetermined angle from about 10 degrees to 180 degrees from vertical (where the large end of the egg in an upwardly vertical position defines zero degrees vertical). This orientation causes the allantois of the egg to pool and enlarge the allantoic sac under the upper portion of the egg shell. A probe is inserted downwardly through the shell of the egg and into the enlarged allantoic sac.

DESCRIPTION OF PREFERRED EMBODIMENTS

The present invention provides a method for reliably locating, localizing, and/or targeting the allantois or allantoic sac of embryonated poultry eggs. As used herein, the term "poultry" includes chickens, turkeys, ducks, geese, quail, pheasants and ostriches, and other avians kept domestically for egg production.

During the final stages of incubation, the allantois normally exists as a relatively thin layer under the inner shell membrane of avian eggs, and essentially surrounds the embryo therein. In later stage (third and fourth quarter) embryonated eggs, the allantois is a difficult target to inject with accuracy. The present invention relates to orienting avian eggs so that the contents of the allantois can be reliably targeted in ovo, e.g., using a needle or probe. Such methods are useful both in injecting substances into the allantois of embryonated avian eggs, and in sampling or assessing the allantoic contents of avian eggs. Proper orientation of the egg enhances the accessibility of the allantoic compartment.

The present inventors unexpectedly found that in eggs where the eggshell had been removed from over the air cell, when the long axis of the egg was rotated away from vertical the allantois initially pooled on the underside of the egg, but after several seconds moved to the upper surface of the egg (see Example 10 herein). Additional investigation revealed that in eggs retaining the egg shell over the air cell (and where only a small window of shell had been removed for visualization), the allantois did not undergo this initial positioning on the underside of the egg when the long axis of the egg was rotated away from vertical. While not wishing to be held to a single theory of the invention, the inventors suspect that in normal eggs with an intact eggshell, the shell plays a role in maintaining an internal pressure within the egg that prevents the initial downward displacement of the allantois that was observed in eggs with the shell removed from over the air cell.

U.S. Pat. No. 5,699,751 to Phelps et al. describes orienting avian eggs at an angle away from vertical, in order to cause the allantois to pool and enlarge on the downward side of the eggshell. The '751 patent teaches that injection of the allantois must occur upwardly or from the side of the egg to reach the allantois without piercing the air cell; where injection is carried out in a downward direction, the '751 patent teaches that the needle traverses the air cell to reach the allantois. Where the egg is upside-down, the '751 patent teaches upward injection through the air cell to reach the pooled area of the allantois. In contrast to the teachings of the '751 patent, the present inventors unexpectedly found that in an intact shell eggs, the allantois pools and enlarges under the upper surface of the egg shell when the long axis of the egg is tilted away from the vertical. In upside-down eggs, the present inventors determined that the allantois pools at the small end of the egg (the uppermost end), antipodal to the air cell located at the large end of the egg.

As used herein, the 'top' of an egg is the large end (containing the air cell), and the 'bottom' is the small end. The 'long axis' (BB') of the egg is that which passes from top to bottom of the egg, and the sagittal or short axis (CC') is perpendicular thereto. As shown in FIG. 3B, a cross-section along plane BC is considered herein as a coronal or frontal section, i.e., one that divides the egg into halves along the long axis, along a plane perpendicular to the short (or sagittal) plane. A sagittal section is that which divides the egg in halves along the short axis (i.e., into top and bottom sections), along a plane perpendicular to the long axis. Where the egg is upright (or upside-down), the 'upper surface of the eggshell' is the eggshell superior to a horizontal sagittal plane that crosses the midpoint of the long axis. Where the egg is angled away from vertical (long axis B–B' is angled from vertical axis A–A'), the 'upper surface of the eggshell', as used herein, is that area of the egg shell superior to plane BC (FIG. 3B); the 'upper quadrant' of the eggshell, as used herein, is that area of the eggshell superior to plane BC and which also lies above a sagittal plane crossing the midpoint of the long axis and perpendicular to the long axis.

Figure 1:
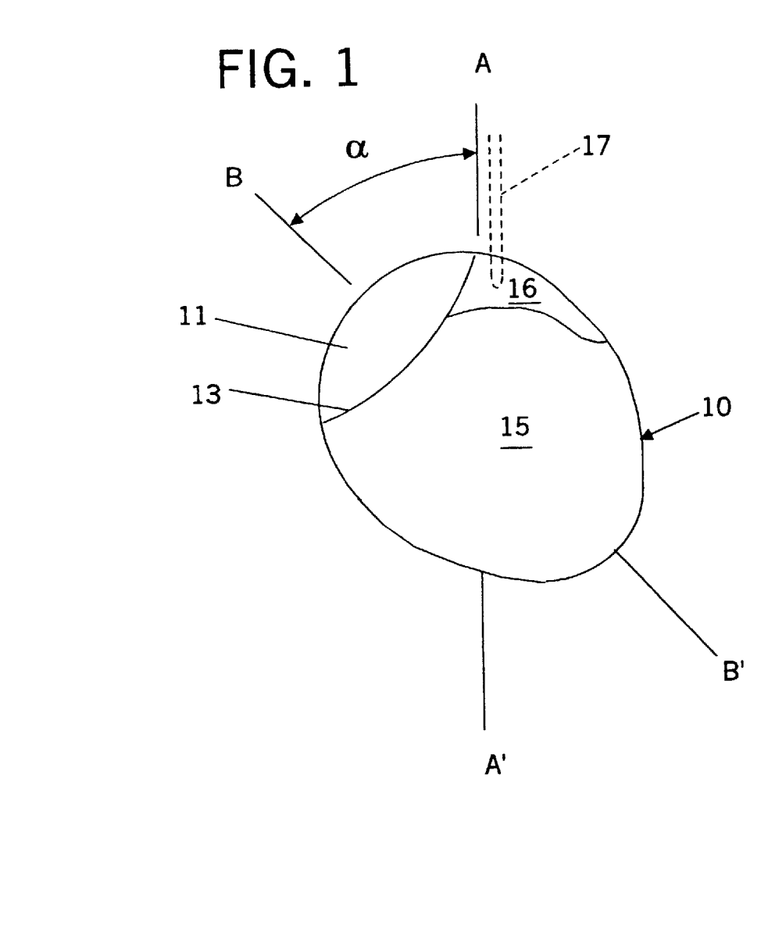
FIG. 1 is a schematic view of an angled avian egg, where the long axis (BB') of the egg is at angle α to vertical (AA').

With reference to FIG. 1 there is illustrated egg 10 having the major or long axis B–B' angled from vertical axis A–A' by $\alpha$ degrees. Within egg 10 there is air sac 11 separated from allantoic sac 12 by air sac membrane 13. Allantoic sac 12 contains the allantois 16 which is fluid and flowable within the egg in response to changes in egg orientation. The large area of the egg indicated generally at 15 contains the amnion, albumin and yolk sac as well as the developing chick embryo (not shown).

With further reference to FIG. 1, it can be seen that the allantois pools to the upper right side of the egg as a consequence of the non-vertical orientation of the egg and thereby produces an enlarged portion of the allantoic sac indicated generally at 16, generally located under the upper quadrant of the egg shell. This enlarged portion of the allantoic sac forms the target area for injection of a material into the allantois or insertion of a sampling device or probe into the allantois. The methods of the present invention described hereinbelow with reference to insertion of a injection device into the allantois for injecting a material into the allantois, are equally suited to the insertion of a sampling device, probe, or other analytical or diagnostic device or material into the allantois.

The injection into the allantois at 16 may be effectively accomplished from several different angles as further illustrated by FIG. 1. For example, the injection may be initiated in a vertically downward direction and parallel to axis A–A', through the upper quadrant of the egg to enter the allantoic sac (not shown). Alternatively, the injection may be initiated into the upper surface of the egg from the side, horizontally (not shown) or at an angle as shown by needle 17. Using the methods of the present invention, injection or piercing of the allantois does not necessarily require injection or piercing of the air cell membrane, even when using a vertically-downward traveling needle or probe. The needle has direct access to the allantoic sac, although the extent of needle penetration into the egg is a function of the angle of injection.

The size of the allantois is related to the stage of embryonic development of the egg to be injected; thus the depth of injection or insertion needed to reach the allantois will vary depending on the developmental stage of the egg as well as the species and strain of avian egg used. For chicken eggs, eggs at days 16–19 of embryonation are preferable for use in the present methods, as the allantois is relatively large at this stage. Days 17–18 are particularly preferred. The depth of injection or insertion must be deep enough to place the needle or probe within the allantois, but not so deep as to pierce the amnion or embryo. Use of a blunt-tip needle helps minimize piercing of the amnion or embryo. In chicken eggs at days 16–19 of embryonation, injection or insertion from $\frac{1}{8}^{th}$ to $\frac{1}{4}^{th}$ of an inch below the egg shell surface is preferred.

The present methods advantageously allow entry through the uppermost side of the egg; most commercial egg injection apparatus are designed to inject eggs using a needle that is vertical and that travels downward into the egg. See e.g., U.S. Pat. No. 4,469,047 to Miller; U.S. Pat. No. 4,681,063 to Hebrank; U.S. Pat. No. 4,903,635 to Hebrank; U.S. Pat. No. 5,056,464 to Lewis; U.S. Pat. No. 5,136,979 to Paul and Ilich; and published PCT application WO 98/31216 to Bounds. (The contents of all US patents listed herein are intended to be incorporated herein in their entirety). The present methods of orienting eggs also allow vertical downward injection while avoiding piercing the air cell membrane. Accordingly, a preferred method of injection is downward along the path of needle 17 since this method of injection is more readily accomplished with minimum modification to existing automatic injection machines.

It will be appreciated by those skilled in the art that the precise location and angle of injection is a matter of choice and could be in any area of the egg's upper surface that overlies the allantois. Orientation of the needle will depend on the orientation of the egg and the equipment available to carry out the injection. While the orientation of the egg as illustrated by angle $\alpha$ in FIG. 1 is about 45 degrees from vertical, the orientation may extend from about 10 degrees up to 180 degrees (the orientation shown in FIG. 2). Preferably, angle $\alpha$ is at least 15 degrees and preferably at least about 20 to 30 degrees, up to about 90 degrees or even up to 180 degrees, in order to maximize the pooled allantois injection target area while still permitting vertically downward injection. Preferred angles of egg orientation include from about 20 degrees to about 45 degrees. Injecting the egg with the long axis of the egg more nearly vertical, i.e., angle $\alpha$ is less than about 10 degrees, increases the chance that the injection needle will traverse the air cell. Where it is desired to avoid piercing the air cell, routine experimentation using eggs of similar age and condition and from the same breed and strain of bird, will allow determination of the minimum angle of egg orientation needed to avoid piercing the air cell in a majority of such eggs.

Figure 2:
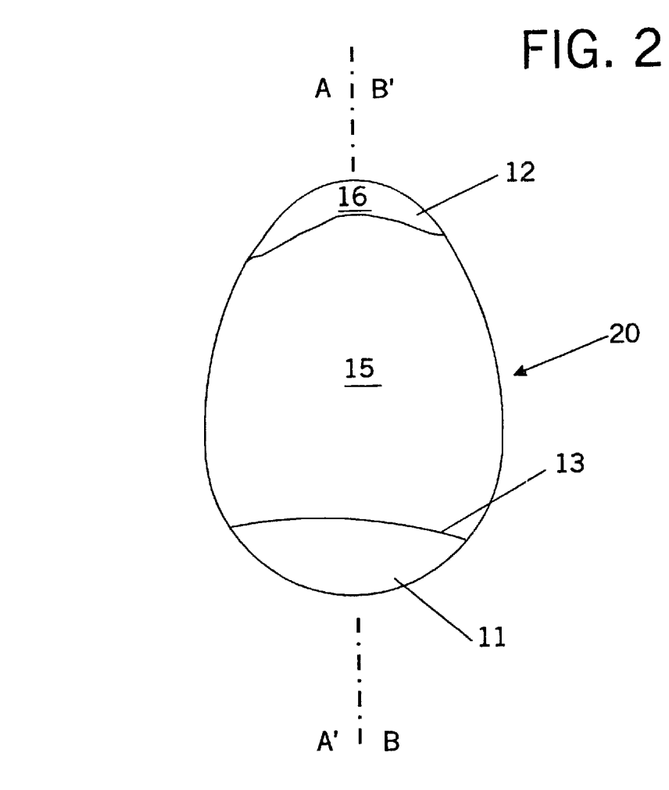
FIG. 2 is a schematic view of an avian egg that has been inverted 180 degrees from the upward vertical position, i.e., so that the small end of the egg is upward and the large end of the egg is downward.

Referring now to FIG. 2 there is illustrated egg 20 in an inverted vertical position at 180 degrees $\alpha$ with the large end of the egg containing the air sac in a downward orientation along axis A–A'/B–B'. The interior components of the egg are identified as in FIG. 1. In the present configuration, the allantois 16 pools at the top of the egg to form enlarged portion of the allantoic sac. In this orientation, the injection into the allantois may be effectively accomplished using a vertical needle or probe that travels downward into the small end of the egg, for example, along axis A–A'. (Injection into the small end of the egg may increase the number of eggs that crack, compared to injection in the large end.) Alternatively, the injection may be made from either side, with a needle that is horizontal or angled. Vertically downward injection along axis A–A' is generally preferred for injecting eggs, since such injection can be most readily accomplished on existing egg injection equipment with a minimum of modification.

Figure 3A:
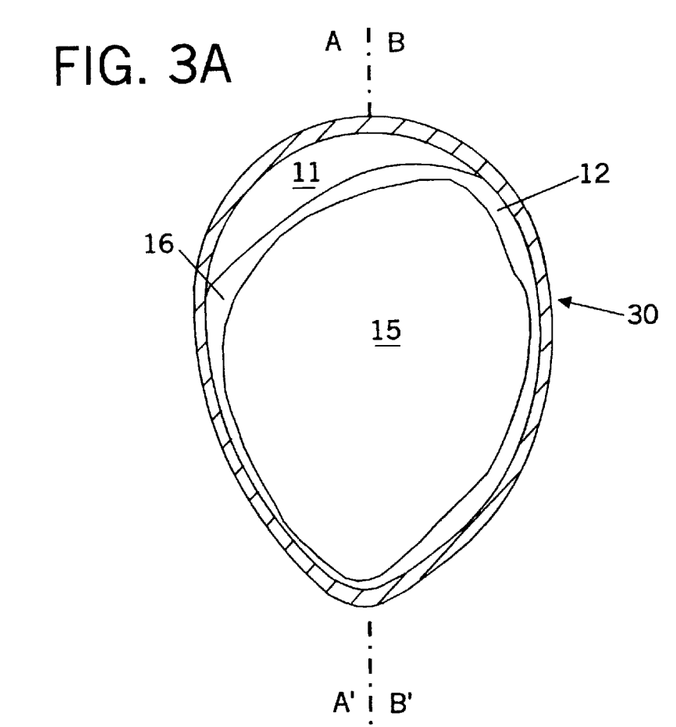
FIG. 3A is a generalized schematic view of an avian egg in about the last quarter of incubation and having the long axis (B–B') oriented vertically. This figure generally illustrates that the allantois is found as a thin layer underlying the shell and essentially surrounding the avian embryo contained within the egg.
Figure 3B:
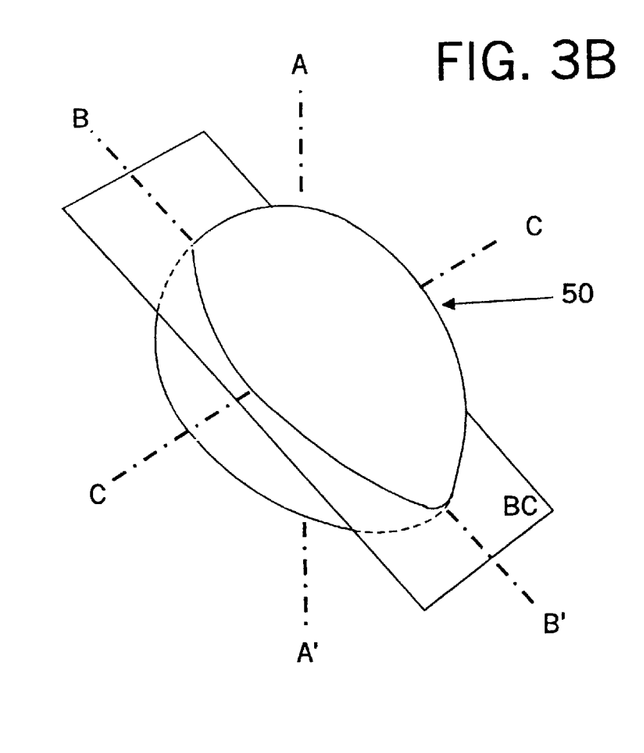
FIG. 3B is a schematic showing an avian egg having its long axis oriented approximately 45° from vertical, and showing vertical axis A–A', long axis B–B', and short or sagittal axis C—C, where plane BC separates the egg into an upper surface and a lower surface.

FIG. 3A shows the general location of the internal compartments of an embryonated chicken egg in the last quarter of incubation. As shown in egg 30, the allantois 16 underlies the air cell 11 and essentially surrounds the area generally indicated as 15 which contains the yolk sac, amnion, albumen and embryo (not shown). Egg 30 is oriented vertically, with the long axis B–B' corresponding to vertical axis A–A'. FIG. 3B illustrates egg 50 with the long axis B–B' oriented 45° from the vertical axis A—A, and showing the short or sagittal axis C—C; plane BC separates the eggshell into an upper surface and a lower surface.

FIGS. 4–11 are tracings from photographs of frontal cross sections (i.e., essentially parallel to long axis B–B') of chicken broiler eggs at various days of incubation (from day 12 to day 18 of incubation), in various orientations (upright, 45° from vertical, 90° from vertical, and 180° degrees from vertical). The location of the air cell 11 and allantois 16 are indicated.

The terms "bird" and "avian" as used herein, include males or females of any avian species, but are primarily intended to encompass poultry which are commercially raised for eggs or meat. Accordingly, the terms "bird" and "avian" are particularly intended to encompass chickens, turkeys, ducks, geese, quail and pheasant. The term "in ovo," as used herein, refers to birds contained within an egg prior to hatch. The present invention may be practiced with any type of bird egg, including chicken, turkey, duck, goose, quail, and pheasant eggs. Chicken and turkey eggs are preferred, with chicken eggs most preferred. Eggs utilized in the present methods may be at any stage of incubation, depending on the reason for injecting or sampling the allantois. Where injection is of substances beneficial to the subsequently hatched bird, the injection is preferably in the fourth quarter of incubation. As used herein, "day 18" eggs refer to eggs during the eighteenth day of incubation, as this term is understood in the art. The present methods may be used with eggs at any stage of incubation, depending on the treatment that the egg is undergoing. For example, injection of microorganism into the allantois for growth thereof typically occurs earlier in incubation that injection of a substance beneficial to the avian embryo, such as a vaccine. Thus the present methods may be used with eggs during the first, second, third or fourth quarter of incubation. With chicken eggs, the present methods are preferably used from about the $5^{th}$ day of incubation to about the $18^{th}$ day of incubation.

As used herein, insertion of a needle or probe or sampling device "directly" into the allantois of an egg refers to insertion into the allantois without traversing the air cell or the avian embryo. It will be understood by those in the art that insertion of a device "directly" into the allantois will require piercing of the egg shell and the membranes that are interposed between the egg shell and the allantoic sac; however, such direct insertion does not traverse the air cell or the embryo.

While the methods of the present invention may be carried out on individual eggs, in a commercial setting the method is typically carried out on a plurality of eggs. In general, in a commercial setting, a plurality of eggs are incubated together in a common incubator. At about the beginning of the final quarter of incubation, the eggs are transferred from the incubator to a hatcher. This step is known as "transfer". At transfer, the step of sampling or sensing the allantoic fluid to assess the condition or status of the embryo within the egg may advantageously be carried out, as can injection of beneficial substances into the allantois.

Figure 12:
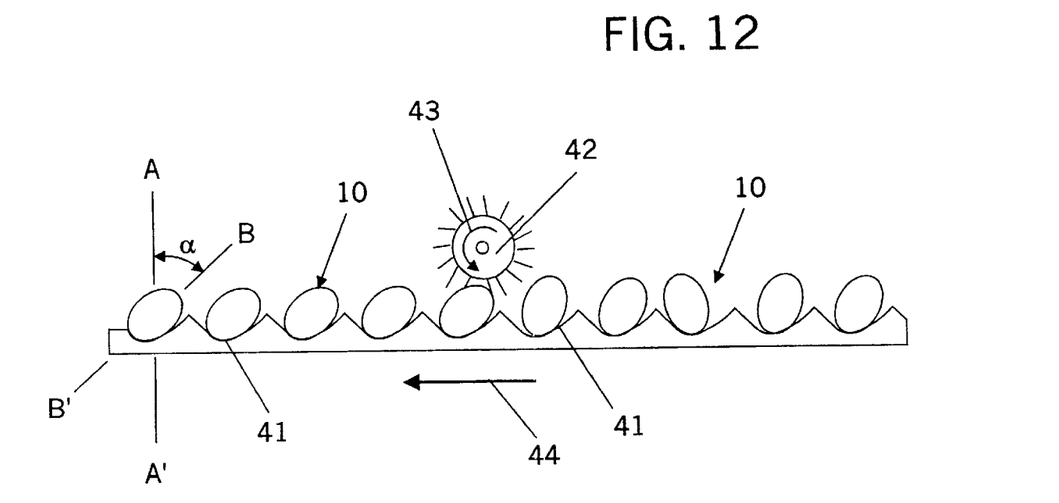
FIG. 12 is a schematic view of an egg tray and egg orientation brush for use in practicing the method of the present invention.

Turning now to FIG. 12, there is illustrated an egg tray for use in automatic egg injection equipment. The desired orientation of the eggs on the tray is α degrees from vertical corresponding to the orientation illustrated in FIG. 1, and the direction of injection is vertically downward. The egg tray comprises a base 40 containing a plurality of egg receptacles 41 which are configured to hold the egg at the desired angle as more clearly illustrated in the enlarged view of FIG. 13.

In the practice of the present invention, the eggs are initially loaded into the egg tray in a conventional manner with the large end of the egg facing in a generally upward direction. The trays may thereupon be placed in the incubators for incubation according to conventional procedures. When the eggs are ready for injection, the egg trays are removed from the incubator and placed on the feed belt for an egg injection machine. Since the eggs will generally not be properly orientated at this stage for injection into the allantois, the egg tray is passed through an egg orientation station which may comprise for example rotating brush 42 as illustrated in FIG. 12. Brush 42 rotates in the direction of the arrow 43 and when tray 40 moves below the brush in the direction of arrow 44, the bristles of the brush sweep the egg and cause the eggs to nestle at the desired angle in receptacles 41 of the egg tray. The egg tray is constructed so that a significant portion of the egg extends above the supporting egg receptacles for contact with the rotating brush. Also in FIG. 12, it can be seen that the eggs to the left of the brush are all properly oriented while those to the right which have not yet passed under the brush are more randomly oriented.

Figure 13:
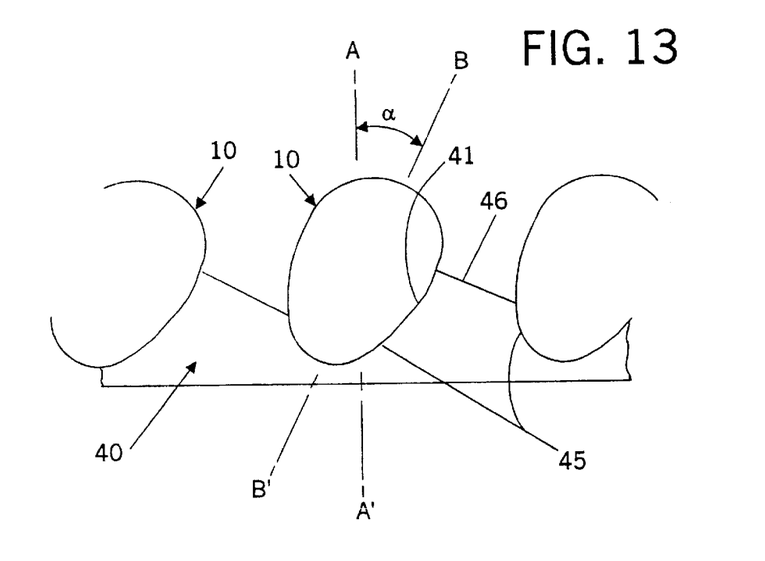
FIG. 13 is an enlarged view of an egg in the egg tray of FIG. 12 showing the configuration of the egg receptacle in greater detail.

With particular reference to FIG. 13, the configuration of the egg receptacles 41 is seen to include a generally elliptical portion 45 conforming to the shape of the small end of the egg, with a ramp portion 46 extending between adjacent receptacles. The ramp portion has a backwards slope to provide maximum support under the egg when the egg is in the desired orientation. The backward slope of ramp portion 46 also exposes a large area on the front of the egg for contact by the rotating brush as illustrated in FIG. 13, and thereby facilitates the movement of the egg into the desired orientation. The egg tray is preferably fabricated of molded plastic or other suitable material with a large percentage of open area (not shown) to permit air circulation around the eggs during the period of incubation. Such fabrication and design is a matter of choice and well within the ability of those skilled in the art.

Alternatively, eggs may be contained in standard egg trays that orient the eggs essentially vertically upright, and the tray itself may be tilted to re-orient the eggs away from vertical. Alternatively, an automated apparatus for injecting eggs may utilize a plurality of cups, each cup adapted for being received in a seated, sealing relation against the shell of an avian egg. See, e.g., U.S. Pat. No. 4,903,635 to Hebrank (incorporated herein in its entirety by reference). For use with the present methods, such cups can be used to orient eggs away from the vertical, for injection according to the present methods. The egg is held in position by a cup and, where the injector or probe is operatively associated with the cup, the cup locates the surface of the egg for injection while adjusting for variations in egg size. In one embodiment, an automated egg injection apparatus comprises a plurality of flexible cups, each of which is adapted for being received in seated, sealing relation against portions of the shell of an egg. Means are provided in communication with the interior of the cups for providing suction so that the eggshell is seated against the cup. The cups are pivotably connected to the injection apparatus, so that an egg seated against a cup may be re-oriented to a position suitable for the present methods. The egg may be re-oriented, for example, by moving the egg tray containing the eggs while the upper portion of each egg is seated within a cup, or by moving the cup itself or the portion of the apparatus to which the cup is pivotably attached.

In an alternative method of the present invention, the allantoic sac is targeted for piercing with a probe for purposes of analyzing or sampling the allantoic fluid rather than injecting an agent or substance into the fluid. If it is desired to sample the allantoic fluid for diagnostic or other purposes, the probe may conveniently be a hypodermic needle having an eggshell piercing tip configuration. Alternatively, the probe may comprise a biosensor or other device designed to analyze the allantoic fluid in situ. In either case, orienting the egg in accordance with the method of the present invention prior to inserting the probe provides an enlarged volume of the allantoic sac in a predetermined area which allows the allantoic sac to be targeted for sampling or analysis with a high degree of accuracy.

The present invention relates to orienting avian eggs to facilitate sampling of allantoic fluid for examination or analysis of components. In the normally oriented upright (large end up) poultry egg, the allantois exists as a relatively thin layer under the inner shell membrane, presenting a difficult target for a sampling device. Orienting the long axis of the egg away from vertical (e.g., 45°, 90°, or 180° from upright) causes upward pooling of the allantois, allowing the allantoic compartment to assume the largest possible target area, and hence contain the greatest volume of fluid from which to sample.

The examples which follow are set forth to illustrate the present invention, and are not to be construed as limiting thereof.

EXAMPLE 1

Materials and Methods: Frozen Eggs

Cobb×Cobb chicken broiler eggs were injected in the allantoic compartment with food coloring and placed at different orientations. Eggs were then frozen and examined. In order to view the unaltered allantois, some eggs were not punched or injected with dye, but were positioned, frozen and examined.

Injection of Dye: Eggs were candled and infertile eggs and non-viable embryos removed from the sample. In the remaining eggs, the lowermost boundary of the air cell was marked with a felt tip marker on the exterior egg shell and a 22 gauge punch used to make a hole in the egg shell just beneath the marked air cell. 200 μL of blue or green food coloring was injected into each egg using a 1cc syringe with a 22 g needle attached.

Orienting Eggs: The eggs injected with food dye, as described above, were arranged in a cardboard flat in the following orientations: upright (large end up); 45° from upright, 90° from upright. The point most perpendicular to the laboratory bench surface was marked on the eggs with a felt-tip marker. The eggs were frozen and placement of the allantois was then examined in the eggs and compared among eggs having different orientations.

EXAMPLE 2

Day 12 Eggs

Figure 4:
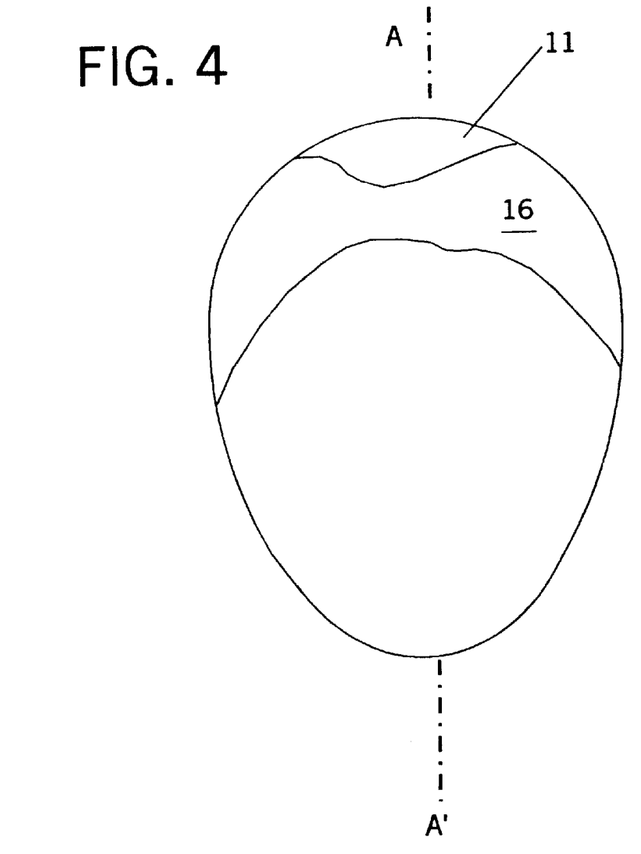
FIG. 4 is a tracing from a photograph of a frontal cross-section of a day 12 broiler egg in the upright orientation, showing the location of the air cell and allantois.
Figure 5:
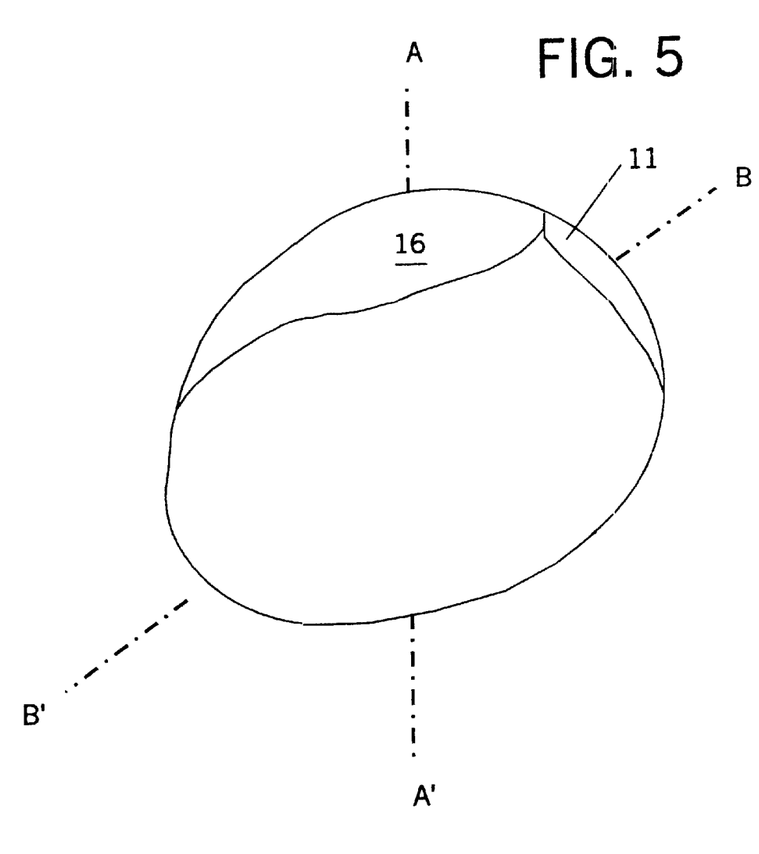
FIG. 5 is a tracing from a photograph of a frontal cross-section of a day 12 broiler egg where the major axis is at a 45° angle to vertical, and showing the location of the air cell and allantois.
Figure 6:
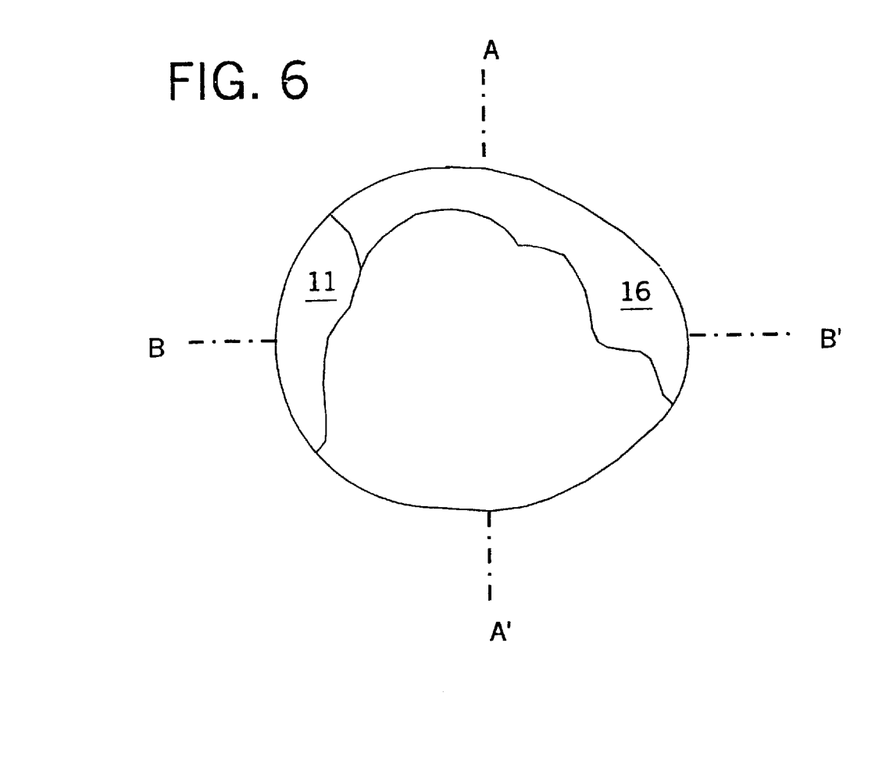
FIG. 6 is a tracing from a photograph of a frontal cross-section of a day 12 broiler egg where the major axis is at a 45° angle to vertical, and showing the location of the air cell and allantois.
Figure 7:
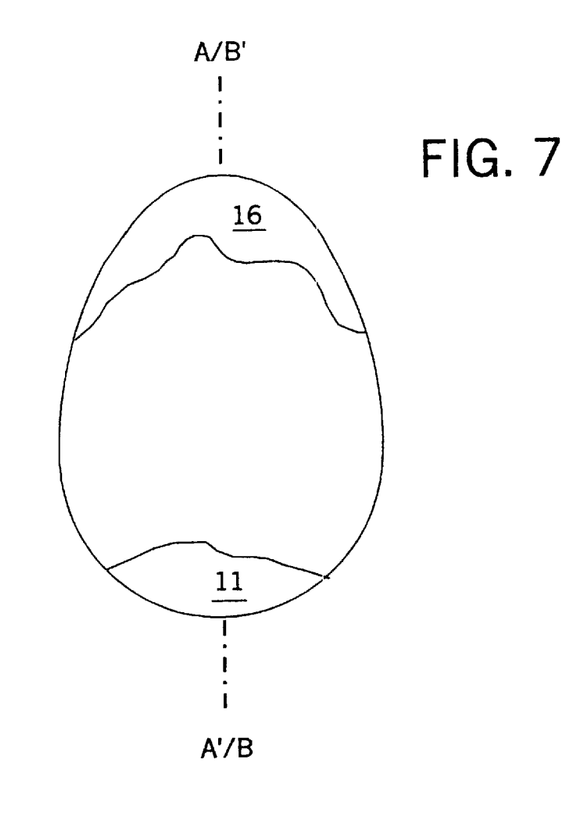
FIG. 7 is a tracing from a photograph of a frontal cross-section of a day 15 broiler egg where the major axis is 180° from vertical, i.e. upside-down, showing the location of the air cell and allantois.

Day 12 Cobb×Cobb broiler eggs were injected with dye, oriented and frozen as described in Example 1. Cross-sections (frontal sections) of the eggs were examined and the allantois was found to be oriented so that the largest allantoic pool (e.g., largest volume of allantoic fluid) was upwards (i.e., was under the surface of the eggshell that was uppermost). Photographs of these eggs were taken (not shown). Tracings of some of the photographs were made to show the location of the allantois and air cell. FIG. 4 shows a day 12 egg in the upright (vertical position); FIG. 5 shows a day 12 egg oriented 45° from vertical; and FIG. 6 shows a day 12 egg oriented 90° from vertical. In each of FIGS. 4–6, the pooled allantois 16 and air cell 11 are indicated.

EXAMPLE 3

Day 15 Eggs

Day 15 Cobb×Cobb broiler eggs were treated as described above for day 12 eggs, with the additional step of orienting some eggs upside-down (i.e., with the small end of the egg uppermost, or 180° from vertical). Again the allantois was found to be oriented so that the largest allantoic pool (e.g., volume of allantoic fluid) was upwards (i.e., was under the surface of the eggshell that was uppermost), even in eggs oriented at 180° Photographs of these eggs were taken (not shown). A tracing of a day 15 egg oriented 180° from vertical was made to show the location of the allantois and air cell, shown in FIG. 7. The pooled allantois 16 was found at the upward-oriented small end of the egg, and the air cell 11 at the downward end of the egg (large end).

EXAMPLE 4

Day 18 Eggs

Figure 8:
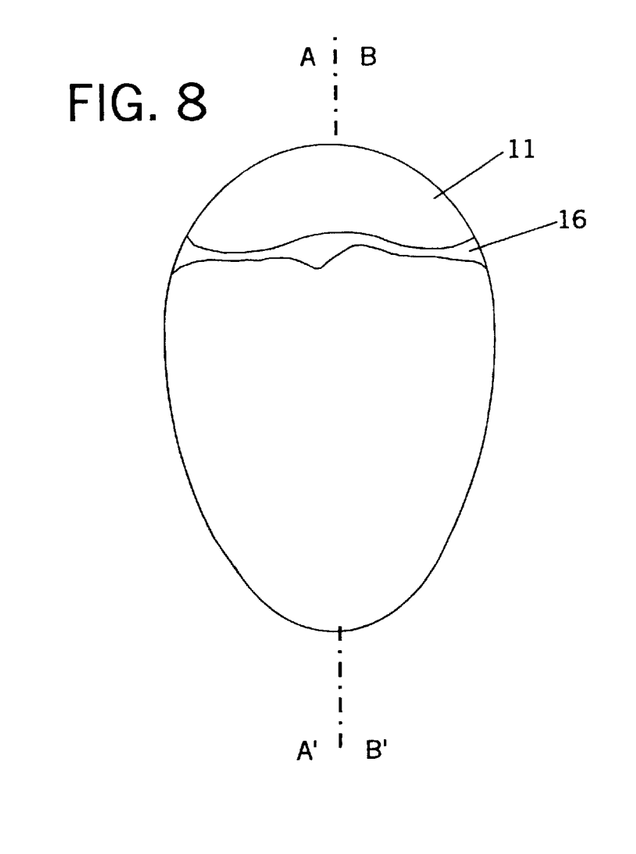
FIG. 8 is a tracing from a photograph of a frontal cross-section of a day 18 broiler egg in upright position, showing the position of the air cell and the allantois.
Figure 9:
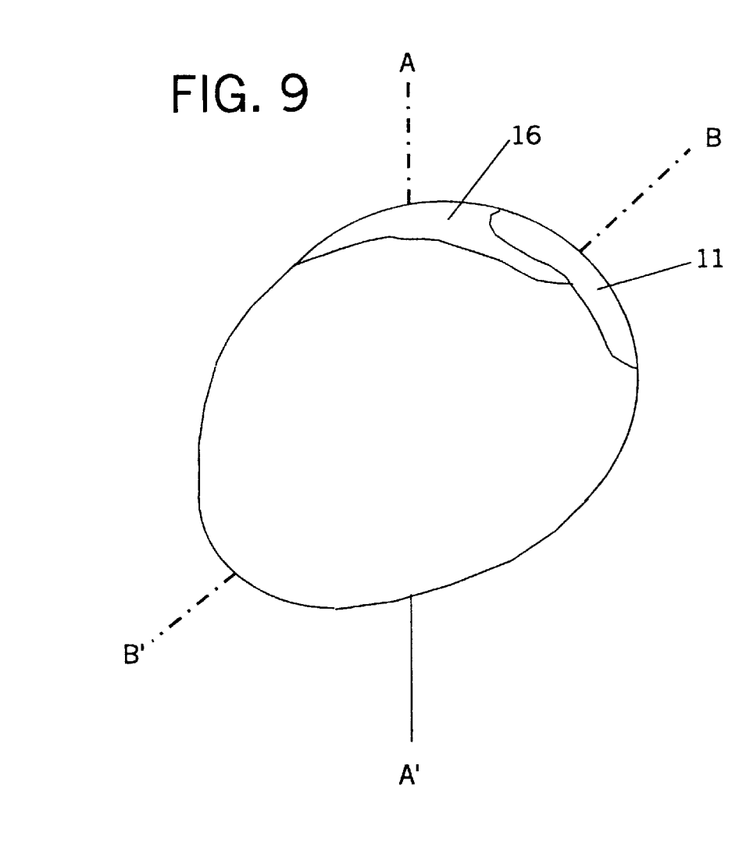
FIG. 9 is a tracing from a photograph of a cross-section of a day 18 broiler egg where the major axis is at a 45° angle to vertical, showing the position of the air cell and the allantois.
Figure 10:
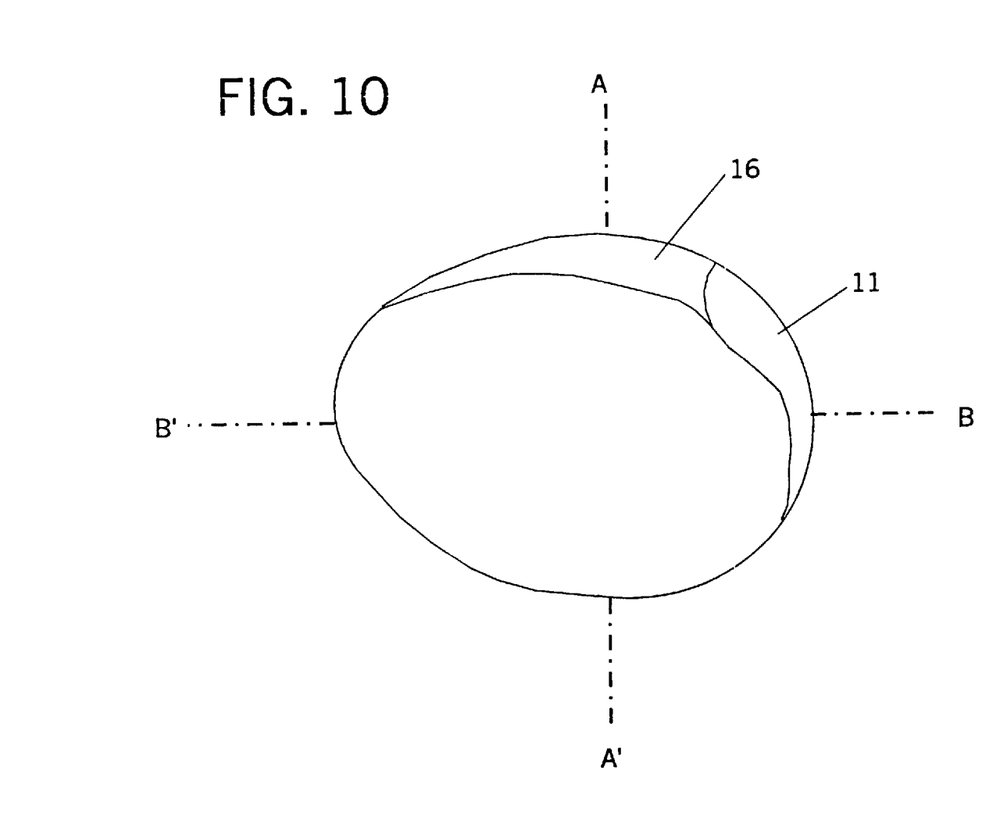
FIG. 10 is a tracing from a photograph of a frontal cross-section of a day 18 broiler egg where the major axis is at a 90° angle to vertical, showing the position of the air cell and the allantois.
Figure 11:
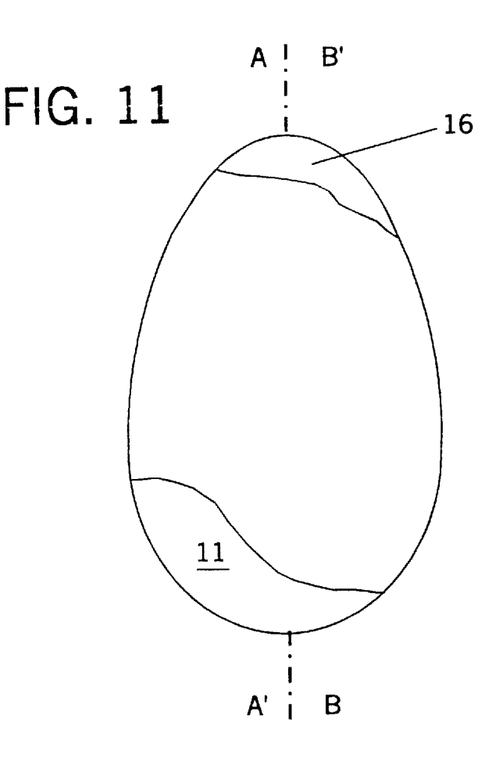
FIG. 11 is a tracing from a photograph of a frontal cross-section of a day 18 broiler egg where the major axis is 180° from vertical, i.e. upside-down, showing the location of the air cell and allantois.

Day 18 Cobb×Cobb broiler eggs were injected with dye, oriented and frozen as described in Example 1 (n=8 eggs for each orientation). Cross-sections (frontal sections) of the eggs were examined and the allantois was found to be oriented so that the largest allantoic pool (e.g., largest volume of allantoic fluid) was upwards (i.e., was under the surface of the eggshell that was uppermost). Photographs of these eggs were taken (not shown). Tracings of some of the photographs were made to show the location of the allantois and air cell. FIG. 8 shows a day 18 egg in the upright (vertical position); FIG. 9 shows a day 18 egg oriented 45° from vertical; FIG. 10 shows a day 18 egg oriented 90° from vertical; and FIG. 11 shows a day 18 egg oriented 180° from vertical. In each of FIGS. 8–11, the pooled allantois 16 and air cell 11 are indicated.

EXAMPLE 5

Day 13 Eggs

Day 13 Cobb×Cobb broiler eggs were treated as described above for day 18 eggs. Again the allantois was found to be oriented so that the largest allantoic pool (e.g., volume of allantoic fluid) was upwards (i.e., was under the surface of the eggshell that was uppermost). Photographs of these eggs were taken (not shown).

EXAMPLE 6

Day 14 Eggs

Day 14 Cobb×Cobb broiler eggs were treated as described above for day 18 eggs. Again the aflantois was found to be oriented so that the largest allantoic pool (e.g., volume of allantoic fluid) was upwards (i.e., was under the surface of the eggshell that was uppermost). Photographs of these eggs were taken (not shown).

EXAMPLE 7

Day 16 Eggs

Day 16 Cobb×Cobb broiler eggs were treated as described above for day 18 eggs, except that some eggs in each orientation were not injected with dye nor was a hole formed in either the egg shell or shell membrane. The allantois was found to be oriented so that the largest allantoic pool (e.g., volume of allantoic fluid) was upwards (i.e., was under the surface of the eggshell that was uppermost), in both the dyed and undyed eggs. Photographs of these eggs were taken (not shown). The making of a hole in the egg shell and membranes during the dying process does not appear to alter the behavior of the allantois.

EXAMPLE 8

Day 15 Eggs: Direct Observation of Allantois Movement Over Time

Day 15 Cobb×Cobb broiler eggs were obtained and the egg shell over the air cell was carefully removed without disrupting the shell membranes. Vegetable oil was applied to the intact membranes, to make the membranes more transparent and facilitate direct observation of the movement of the allantoic sac fluid. When eggs were tilted 90° from upright, the allantois was observed to initially orient downwards (i.e., closest to the eggshell surface that is downwards). Within approximately 10 seconds, the allantois displaced upwards and settled in an upward position as described above. This initial downward movement of the allantois was also seen in eggs displaced less than 90° from upright, for example, in eggs displaced 45° from upright.

To determine whether the removal of the egg shell over the air cell had an effect on allantois movement, day 15 Cobb×Cobb broiler eggs were obtained and the egg shell was carefully removed to create small 'windows' in the side of the eggs, while leaving the egg membranes intact. The egg shell over the air cell was left intact. Eggs were displaced up to 180° from vertical. In contrast to the movement of the allantois in day 15 eggs which lacked the egg shell covering the air cell, in the eggs where the eggshell was left intact over the air cell, the allantois did not initially orient itself downwards in eggs (eggs displaced from 1° to 180° from vertical were observed). The allantois oriented itself as described in Examples 2–7, above, without the initial period of downward orientation seen in eggs lacking a shell over the air cell.

EXAMPLE 9

Injection of Allantois through Side of Egg

To assess the reliability of injection through the side of avian shell eggs to target the allantoic fluid, latex was injected into day 17 and 18 chicken eggs. The eggs were candled and the observed boundaries of the air cell and embryo were marked on the egg shell. A punch hole was made approximately $1/8$" to $1/4$" below the aircell line (i.e., the bottom-most boundary of the aircell), and latex was injected into the egg at an injection depth of $1/4$", while eggs were oriented from 75° to 90° away from vertical. The needle angle was about 20° to 30° relative to vertical, with the tip pointed away from the aircell and into the body of the egg.

Placement into the allantois was 100% in these day 17 and 18 eggs, and was more consistent and reliable compared to that achieved using injection through the top (large end) of the egg, through the air cell and into the allantois. Successful placement of latex in the allantois at Day 18 using injection ($7/8$" depth) through the top (large end) of eggs had previously been found to miss the allantois from 20% to 30% of the time.

The foregoing examples are illustrative of the present invention, and are not to be construed as limiting thereof. The invention is described by the following claims, with equivalents of the claims to be included therein.

That which is claimed is:

1. A method for injecting a substance into the allantois of an avian egg which comprises:
   selecting an avian egg in the last quarter of incubation;
   orienting the long axis of the egg to a predetermined angle from about 10 degrees to 180 degrees from vertical, wherein the large end of the egg in an upwardly vertical position defines zero degrees vertical, said orientation causing the allantois of the egg to pool and enlarge the allantoic sac in an area of the egg under the upper portion of the egg shell;
   inserting a needle downwardly through the shell of the egg and directly into the enlarged allantoic sac, wherein said needle does not traverse an air cell or an avian embryo within the avian egg, and
   discharging the substance through the needle and into the allantois of the egg.

2. The method of claim 1 wherein said egg is a chicken egg in the $16^{th}$ to $19^{th}$ day of incubation.

3. The method of claim 1 wherein said egg is a chicken egg in the $17^{th}$ to $18^{th}$ day of incubation.

4. The method of claim 1 wherein the needle is inserted through the upper quadrant of the egg shell.

5. The method of claim 1 wherein the long axis of the egg is oriented to a predetermined angle of from about 20 to 50 degrees from vertical whereby the allantois is caused to pool and enlarge the allantoic sac on the upward side of the egg.

6. The method of claim 1 wherein the injection needle is inserted vertically downward through the upper surface of the egg, and into the allantois in the enlarged area of the allantoic sac.

7. The method of claim 1 wherein the injection needle is inserted at an angle to vertical through the side of the egg and into the allantoic sac.

8. The method of claim 7 wherein the injection needle is inserted horizontally through the side of the egg and into the enlarged allantoic sac.

9. The method of claim 1 wherein the long axis of the egg is oriented to 180 degrees whereby the allantois is caused to pool and enlarge the allantoic sac at the uppermost end of the egg.

10. The method of claim 9 wherein the injection needle is inserted vertically downward into the allantois.

11. The method of claim 1 wherein the long axis of the egg is oriented to an angle of from about 105 to 155 degrees from vertical whereby the allantois is caused to pool and enlarge the allantoic sac in the upper quadrant of the egg.

12. The method of claim 11 wherein the injection needle is inserted vertically downward into the allantois.

13. The method of claim 11 wherein the injection needle is inserted downward at an angle between vertical and horizontal.

14. The method of claim 11 wherein the injection needle is inserted horizontally through the side of the egg and into the allantoic sac.

15. A method for injecting a substance into the allantois of a plurality of chicken eggs which comprises:
   selecting a plurality of avian eggs in the $16^{th}$ to $19^{th}$ day of incubation;

causing said selected eggs to be oriented on an egg tray to a predetermined angle from about 10 degrees to 180 degrees from vertical, wherein zero degrees vertical is defined by the large end of the egg in a vertically upward position, whereby the allantois of each egg is caused to pool and enlarge the allantoic sac in a predetermined area of the egg under the upper portion of the egg shell;

inserting an injection needle into each egg through the shell of the egg and directly into the enlarged allantoic sac in said predetermined area, said needle traveling downward, wherein said needle does not traverse an air cell or an avian embryo within a majority of the injected eggs; and discharging a substance through the needle and into the allantois of each egg.

16. A method of claim 15 wherein the eggs are in the $17^{th}$ to $18^{th}$ day of incubation.

17. A method of claim 15 wherein the long axis of the egg is oriented to a predetermined angle of from about 20 to 50 degrees whereby the allantois is caused to pool and enlarge the allantoic sac on the upward side of each egg.

18. The method of claim 15 wherein said egg tray includes an egg receptacle configured to hold an egg at the predetermined angle.

19. The method of claim 15 wherein said eggs on said egg tray have an exposed upper surface, and said eggs are seated in said egg receptacles at said predetermined angle by egg orientation means acting against said exposed upper surface.

20. The method of claim 19 wherein said egg orientation means comprise a rotating bristle brush acting against said exposed upper surface of said eggs.

21. A method for directing a probe into the allantois of an avian egg which comprises:

selecting an avian egg in the last quarter of incubation;

orienting the long axis of the egg to a predetermined angle from about 10 degrees to 180 degrees from vertical wherein the large end of the egg in an upwardly vertical position defines zero degrees vertical, thereby causing the allantois of the egg to pool and enlarge the allantoic sac under the upper portion of the egg shell; and inserting a probe downwardly through the shell of the egg and directly into the enlarged allantoic sac, wherein said probe does not traverse an air cell or an avian embryo within the avian egg.

22. The method of claim 21 wherein the egg is a chicken egg in the $16^{th}$ to $19^{th}$ day of incubation.

23. The method of claim 21 wherein the long axis of the egg is oriented to a predetermined angle of from about 20 to 50 degrees from vertical whereby the allantois is caused to pool and enlarge the allantoic sac on the upward side of the egg.

24. The method of claim 21 wherein the long axis of the egg is oriented to 180 degrees whereby the allantois is caused to pool and enlarge the allantoic sac at the uppermost end of the egg.

25. The method of claim 21 wherein said probe is inserted at an angle between vertically upward and horizontal which causes the needle to penetrate the allantoic sac.

26. The method of claim 21 wherein the long axis of the egg is oriented to an angle of from about 105 to 155 degrees from vertical whereby the allantois is caused to pool and enlarge the allantoic sac in the upper quadrant of the egg.

27. The method of claim 21 wherein said probe is a hypodermic needle.

28. The method of claim 21 wherein said probe is a biosensor.

* * * * *